US010129629B1

(12) United States Patent
Betita (10) Patent No.: US 10,129,629 B1
(45) Date of Patent: Nov. 13, 2018

(54) WIRELESS DONGLE STORAGE FOR HEAD-WORN AUDIO DEVICES

(71) Applicant: Plantronics, Inc., Santa Cruz, CA (US)

(72) Inventor: Stephen Conrad Betita, La Selva Beach, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/796,633

(22) Filed: Oct. 27, 2017

(51) Int. Cl.
*H04R 5/033* (2006.01)
*H04R 1/10* (2006.01)
*H04W 84/12* (2009.01)
*H04W 4/80* (2018.01)

(52) U.S. Cl.
CPC ........... *H04R 1/1041* (2013.01); *H04R 1/105* (2013.01); *H04R 1/1008* (2013.01); *H04R 1/1058* (2013.01); *H04R 2420/07* (2013.01); *H04R 2420/09* (2013.01); *H04W 4/80* (2018.02); *H04W 84/12* (2013.01)

(58) Field of Classification Search
USPC ........ 381/71.1, 74, 111, 151, 371, 309, 370, 381/362, 376
See application file for complete search history.

(56) References Cited

U.S. PATENT DOCUMENTS

2008/0069391 A1* 3/2008 Steyn ................... H04R 1/1025
381/371
2010/0046781 A1* 2/2010 Chen .................... H04R 1/1091
381/371

* cited by examiner

*Primary Examiner* — Yosef K Laekemariam
(74) *Attorney, Agent, or Firm* — Jeremy S. DesRosier (57) ABSTRACT

The present disclosure relates to dongle storage for head-worn audio devices. In one aspect, a head-worn audio device includes a headband having a first end and a second end. An ear sub-assembly is disposed at one or both of the first end and the second end of the headband. The headband includes a receptacle configured for removable insertion of a wireless dongle.

20 Claims, 7 Drawing Sheets

WIRELESS DONGLE STORAGE FOR HEAD-WORN AUDIO DEVICES

FIELD

The present disclosure relates generally to accessories for head-worn audio devices. More particularly, the present disclosure relates to the storage of wireless dongles for head-worn audio devices such as headphones and headsets.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Wireless head-worn audio devices, such as headsets and headphones, communicate with a host device (e.g., a laptop computer, a desktop computer, a mobile phone, etc.) by sending and receiving radio frequency (RF) transmissions. Most modern host devices include an integrated wireless transceiver and antenna that operates in accordance with a common wireless communications standard, such as Bluetooth or DECT. Unfortunately, however, a host device's integrated wireless hardware may provide a subpar user experience when interfacing with a head-worn audio device. For example, if a host device's integrated wireless hardware is maintaining simultaneous wireless links with multiple peripheral devices, the wireless link with a given headset may lack the necessary bandwidth for wideband audio voice communications or high bitrate audio streaming. Still yet, a host device's integrated wireless hardware may not be compatible with proprietary communications that can be sent to and/or received from a head-worn audio device for configuring settings, controlling multimedia playback, and facilitating phone calls. For example, a head-worn audio device may be operable to communicate control commands, such as call answer, call end, mute, next track, previous track, pause, and/or play, to a host device only via a wireless dongle that is connected to the host device. Accordingly, premium head-worn audio devices, such as unified communications (UC) headsets, are often sold with dedicated wireless dongles that provide for greater headset control and improved audio quality.

SUMMARY

In general, in one aspect, the invention relates to a head-worn audio device. The head-worn audio device includes a headband having a first end and a second end. The headband includes a receptacle configured for removable insertion of a wireless dongle. Also, the head-worn audio device includes a first ear sub-assembly disposed at the first end of the headband. The first ear sub-assembly includes a first earcup and a first ear cushion coupled to the first earcup. Further, the head-worn audio device includes a second ear sub-assembly disposed at the second end of the headband. The second ear sub-assembly includes a second earcup and a second ear cushion coupled to the second earcup.

In general, in one aspect, the invention relates to a head-worn audio device. The head-worn audio device includes a headband having a first end and a second end. The headband includes a receptacle configured for removable insertion of a wireless dongle. Additionally, the head-worn audio device includes an ear sub-assembly disposed at one of the first end and the second end of the headband. The ear sub-assembly includes an earcup and an ear cushion coupled to the earcup.

In general, in one aspect, the invention relates to a dongle caddy. The dongle caddy includes a receptacle configured for removable insertion of a wireless dongle. Also, the dongle caddy includes attachment means for removable attachment to a headband of a head-worn audio device. The attachment means is fixedly coupled to the receptacle.

The details of one or more implementations are set forth in the accompanying drawings and the description below. Other features will be apparent from the description and drawings, and from the claims.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

Premium head-worn audio devices, such as UC headsets, are sold with a dedicated wireless dongle for interfacing with a host device to provide for greater headset control and improved audio quality. Unfortunately, because wireless dongles are often very small, about the size of a fingernail, wireless dongles are easily lost within travel bags and on untidy desks. Although some head-worn audio devices are sold with travel pouches, wireless dongles may be easily misplaced within such pouches or fall out of unclosed pockets in such pouches without the knowledge of the device's user. Further still, some head-worn audio devices have included a wireless dongle storage location in the earcup of the head-worn audio device. Earcup storage is impractical for numerous reasons. First, with an increasing number of electronic components being housed in otherwise shrinking earcup assemblies, there may not be room for wireless dongle storage. Second, in earcups where a dongle may be stored, a loose dongle or storage door may rattle, thereby decreasing the perceived acoustic performance of the head-worn audio device.

In general, embodiments of the invention provide for headband-based wireless dongle storage. The embodiments disclosed herein provide wireless dongle storage mechanisms that reduce the likelihood of losing a dongle, while ensuring that an audio device's wireless dongle is always readily available for connecting to a host device.

Figure 1A:
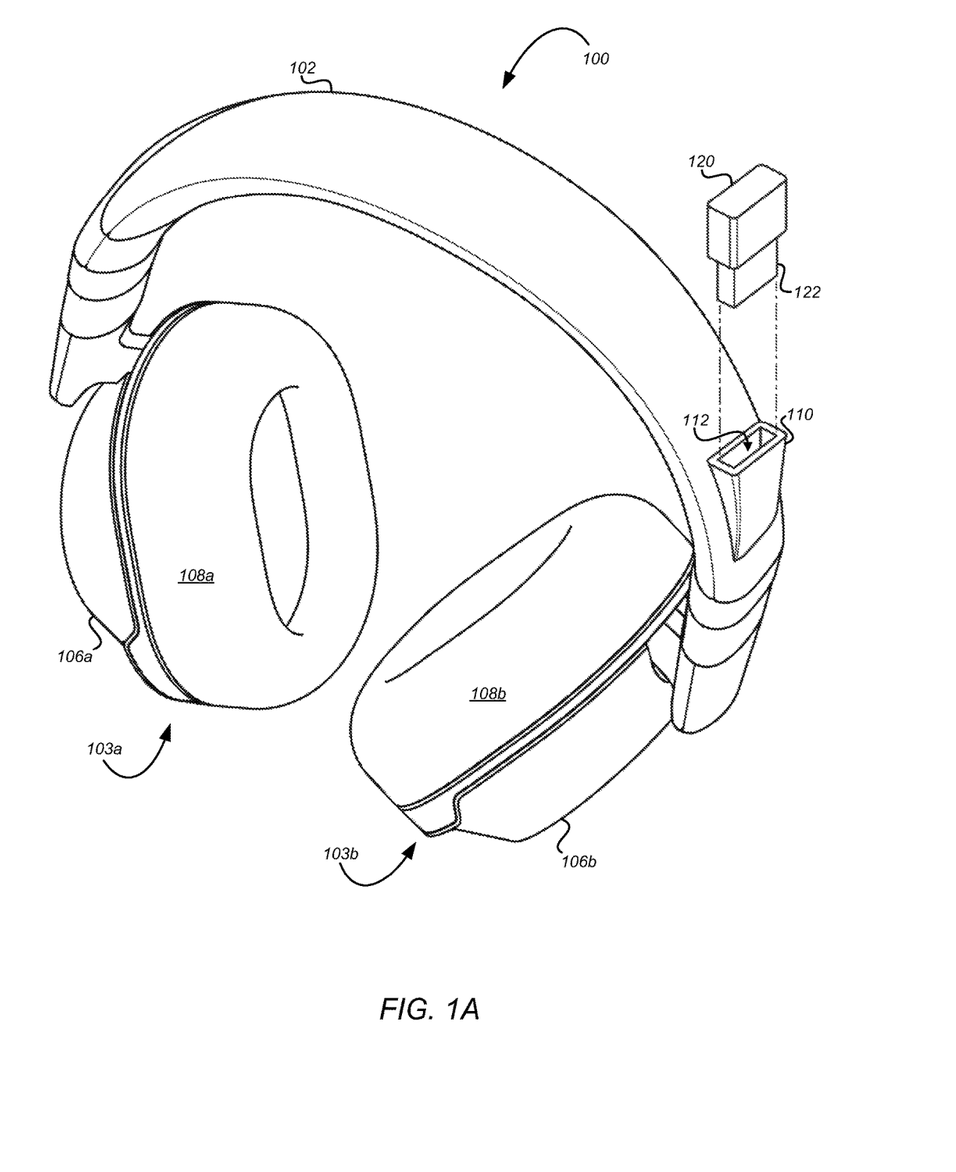
FIGS. 1A and 1B are perspective views of a head-worn audio device with wireless dongle storage, in accordance with one or more embodiments of the invention.
Figure 1B:
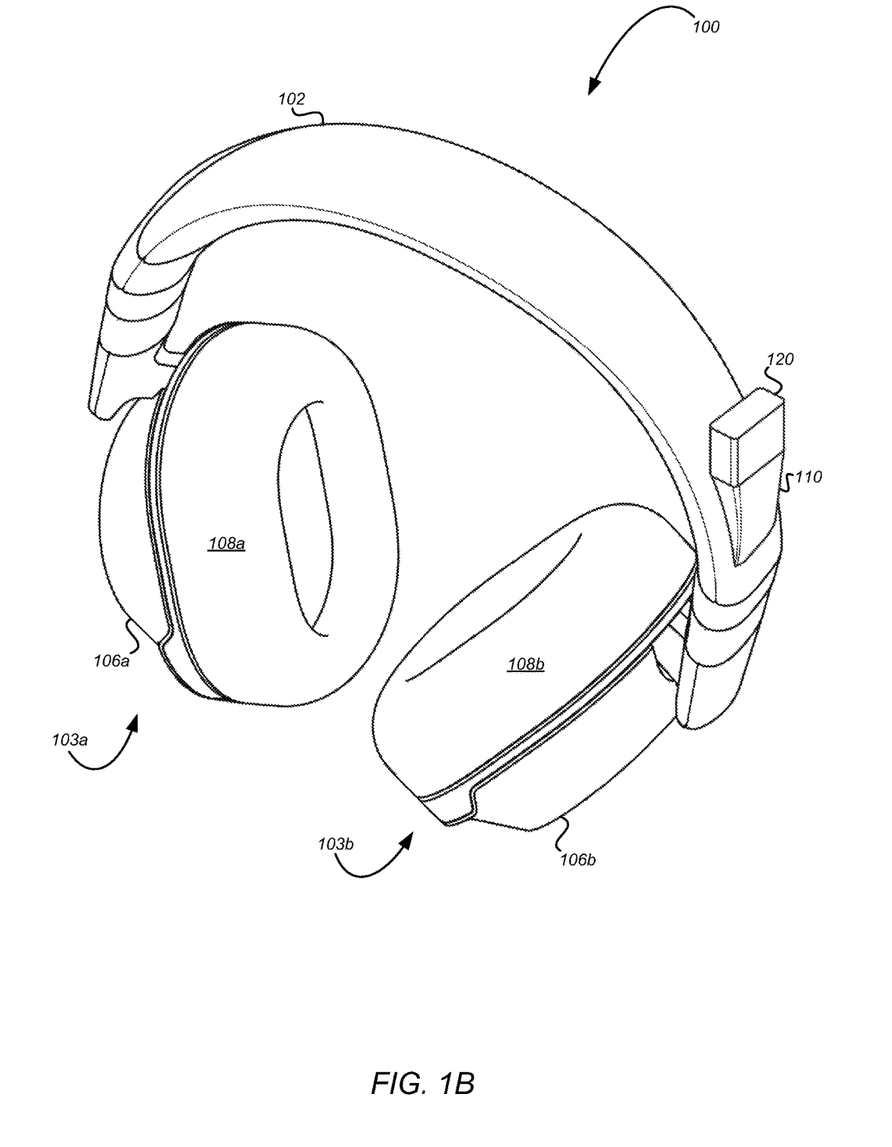

FIGS. 1A and 1B show a head-worn audio device 100 according to one or more embodiments. Although the elements of the head-worn audio device 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 1A and 1B may be omitted, repeated, and/or substituted. Accordingly, various embodiments may lack one or more of the features shown. For this reason, embodiments of the invention should not be considered limited to the specific arrangements of elements shown in FIGS. 1A and 1B.

As illustrated in FIGS. 1A and 1B, a head-worn audio device 100 includes a headband 102 that interconnects a left ear sub-assembly 103a and a right ear sub-assembly 103b. The left ear sub-assembly 103a is shown to include a left earcup 106a coupled with a left ear cushion 108a. Similarly, the right ear sub-assembly 103b includes a right earcup 106b coupled with a right ear cushion 108b. Each of the earcups 106 may house a speaker for generating audio signals that are perceptible to a user that is wearing the head-worn audio device 100. As an option, the head-worn audio device 100 may include one or more microphones for receiving speech that is spoken by the wearing user (i.e., a headset). Although each of the head-worn audio devices shown and described in reference to FIGS. 1-5 are binaural devices, it is contemplated that the concepts described herein may be equally applicable to monaural head-worn audio devices, such as monaural headsets that include a single ear-subassembly (i.e., single earcup, single ear cushion, etc.) and temple-pad interconnected by a headband.

In one or more embodiments, the head-worn audio device 100 comprises a set of over-the-ear (e.g., circumaural, etc.) headphones. In one or more embodiments, the head-worn audio device 100 comprises a set of on-the-ear (e.g., supraaural, etc.) headphones. Accordingly, as described herein, the ear cushions 108 may include any suitable interface between the earcups 106 and a wearing user's face. In one or more embodiments, the ear cushions 108 provide an acoustic seal that improves the listening experience of the user. As an option, the ear cushions 108 may include a foam (e.g., urethane foam, etc.), gel, leather, and/or leatherette material to ensure durability and resilience of the head-worn audio device 100, while providing comfort to the wearing user.

As shown in FIGS. 1A and 1B the headband 102 is a curved or arched band having the left ear sub-assembly 103a disposed at a first end of the headband 102 and the right ear sub-assembly 103b disposed at a second end of the headband 102. The headband 102 may be configured to rest on top of the head of a user wearing the head-worn audio device 100, such that the head-worn audio device 100 is entirely supported by the user's head with the left ear sub-assembly 103a and right ear sub-assembly 103b pressed against the user's left and right ears, respectively. In one or more embodiments, the headband 102 may include a rigid metal or plastic member. Further, in one or more embodiments, cables traveling along and/or within the headband 102 may enable communication (e.g., audio signals, digital communications, etc.) between electronic and/or acoustic componentry housed in the different ear sub-assemblies 103.

Still referring to FIG. 1A, the headband 102 of the head-worn audio device 100 includes a receptacle 110 proximate to the right ear sub-assembly 103b and extending from the headband 102 at an acute angle relative to the arc of the headband 102. Although the receptacle 110 is depicted proximate to the right ear sub-assembly 103b, it is understood that, in one or more embodiments, the receptacle 110 may instead be proximate to the left ear sub-assembly 103a. The receptacle 110 is a generally rigid and at least partially hollow member that includes a cavity 112 for receiving a plug 122 of a wireless dongle 120. In other words, when the wireless dongle 120 is not in use, it may be stored in the receptacle 110 of the headband 102. When the headset 100 is being worn by a user, the wireless dongle 120 may be inserted into and removed from the receptacle 110 by the user moving the wireless dongle 120 in a generally vertical direction. The wireless dongle 120 may include a wireless transceiver and antenna. The plug 122 of the wireless dongle 120 may include a plurality of pins for electrically coupling the transceiver of the wireless dongle 120 with a host device, such as a desktop or laptop computer. Thus, when the wireless dongle 120 is removed from the receptacle 110 and connected to a host device, the wireless dongle 120 may enable the host device to form a wireless link with the head-worn audio device 100. In one or more embodiments, the wireless transceiver of the wireless dongle 120 may be, for example, a DECT transceiver, Bluetooth transceiver, or IEEE 802.11 (Wi-Fi) transceiver. Accordingly, the head-worn audio device 100 may also include, such as within one of the ear sub-assemblies 103, a wireless transceiver and antenna for communicating with the wireless dongle 120.

In one or more embodiments, the plug 122 may include a Universal Serial Bus (USB) Type A plug. In such embodiments, the cavity 112 may be a generally rectangular opening in the receptacle 110 that is approximately 12 mm wide×4.5 mm tall. Further, in such embodiments, the cavity 112 may be between 10 mm and 20 mm deep. For example, the cavity may be approximately 14 mm deep. In one or more embodiments, the plug 122 may include a USB Type C plug. In such embodiments, the cavity 112 may be a generally obround opening in the receptacle 110 that is approximately 8.3 mm wide×2.4 mm tall. Further, in such embodiments, the cavity 112 may be between 5 mm and 15 mm deep. For example, the cavity may be approximately 7 mm deep. To this end, in one or more embodiments, the cavity 112 of the receptacle 110 may have height, width, and length configured for frictionally holding the plug 122 of the wireless dongle 120. In one or more embodiments, the receptacle 110 may inappreciably deform when the plug 122 is inserted within the cavity 112. Accordingly, when the plug 122 of the wireless dongle 120 is inserted in the cavity 112, the receptacle 110 may securely hold the wireless dongle 120, as illustrated in FIG. 1B, such that it does not fall out, become separated from the head-worn audio device 100, and potentially become lost.

Figure 2:
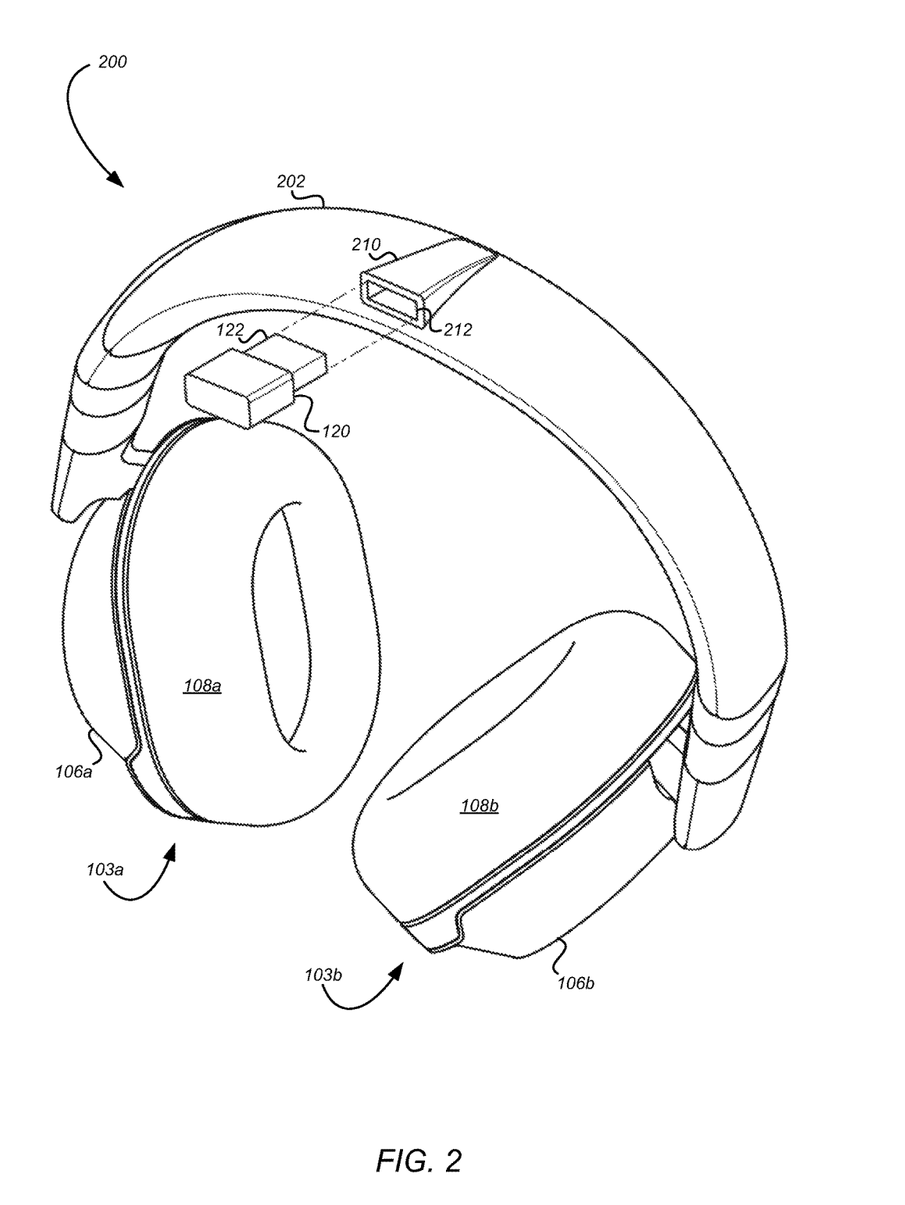
FIG. 2 is a perspective view depicting a head-worn audio device with wireless dongle storage, in accordance with one or more embodiments of the invention.

FIG. 2 shows a head-worn audio device 200 according to one or more embodiments. Although the elements of the head-worn audio device 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2 may be omitted, repeated, and/or substituted. Accordingly, various embodiments may lack one or more of the features shown. For this reason, embodiments of the invention should not be considered limited to the specific arrangements of elements shown in FIG. 2.

As depicted in FIG. 2, a head-worn audio device 200 includes a headband 202 that interconnects a left ear sub-assembly 103a and a right ear sub-assembly 103b. The left ear and right ear sub-assemblies 103 may be substantially identical to those described above in the context of FIGS. 1A and 1B. The headband 202 is a curved or arched band having the left ear sub-assembly 103a disposed at a first end of the headband 202 and the right ear sub-assembly 103b disposed at a second end of the headband 202. The headband 202 may be configured to rest on top of the head of a user wearing the head-worn audio device 200, such that the head-worn audio device 200 is entirely supported by the user's head with the left ear sub-assembly 103a and right ear sub-assembly 103b pressed against the user's left and right ears, respectively. In one or more embodiments, the headband 202 may include a rigid metal or plastic member. Further, in one or more embodiments, cables traveling along and/or within the headband 202 may enable communication (e.g., audio signals, digital communications, etc.) between electronic and/or acoustic componentry housed in the different ear sub-assemblies 103.

Still referring to FIG. 2, the headband 202 of the head-worn audio device 200 includes a receptacle 210 that is located approximately equidistant from the left ear sub-assembly 103a disposed at the first end of the headband 202 and the right ear sub-assembly 103b disposed at the second end of the headband 202. In other words, the receptacle 210 is located at approximately the top or apex of the headband 202. The receptacle 210 is a generally rigid and at least partially hollow member that includes a cavity 212 for receiving the plug 122 of the wireless dongle 120. In other words, when the wireless dongle 120 is not in use, it may be stored in the receptacle 210 of the headband 202. When the headset 200 is worn by a user, the wireless dongle 120 may be inserted into and removed from the receptacle 210 by the user moving the wireless dongle 120 in a generally horizontal direction. In other words, the head-worn audio device 200 of FIG. 2 is substantially similar to the head-worn audio device 100, described in reference to FIGS. 1A and 1B, except for the location and orientation of the receptacle 210 of the headband 202 relative to the receptacle 110 of the headband 102. Accordingly, the characteristics and dimensions of the cavity 212 of the receptacle 210 may be substantially identical to those of the cavity 112 of the receptacle 110, described above in reference to FIGS. 1A and 1B.

The receptacles 110 and 210 may be attached to the headbands 102 and 202, respectively, in any suitable manner. In one or more embodiments, where the headbands 102 and 202 are covered with a soft material (e.g., fabric, leather, leatherette, etc.), the receptacles 110 and 210 may be affixed under the soft material. For example, the receptacles 110 and 210 may be sewn into the soft material wrapping the headbands 102 and 202, respectively. As another example, the soft material may be affixed on the receptacles 110 and 210 using an adhesive. Similarly, the receptacles 110 and 210 may be affixed to the headbands 102 and 202, respectively, using an adhesive. In one or more embodiments, the receptacles 110 and 210 may be integrally formed (e.g., injection molded, ultrasonically welded, etc.) with at least a portion of the headbands 102 and 202, respectively.

Figure 3A:
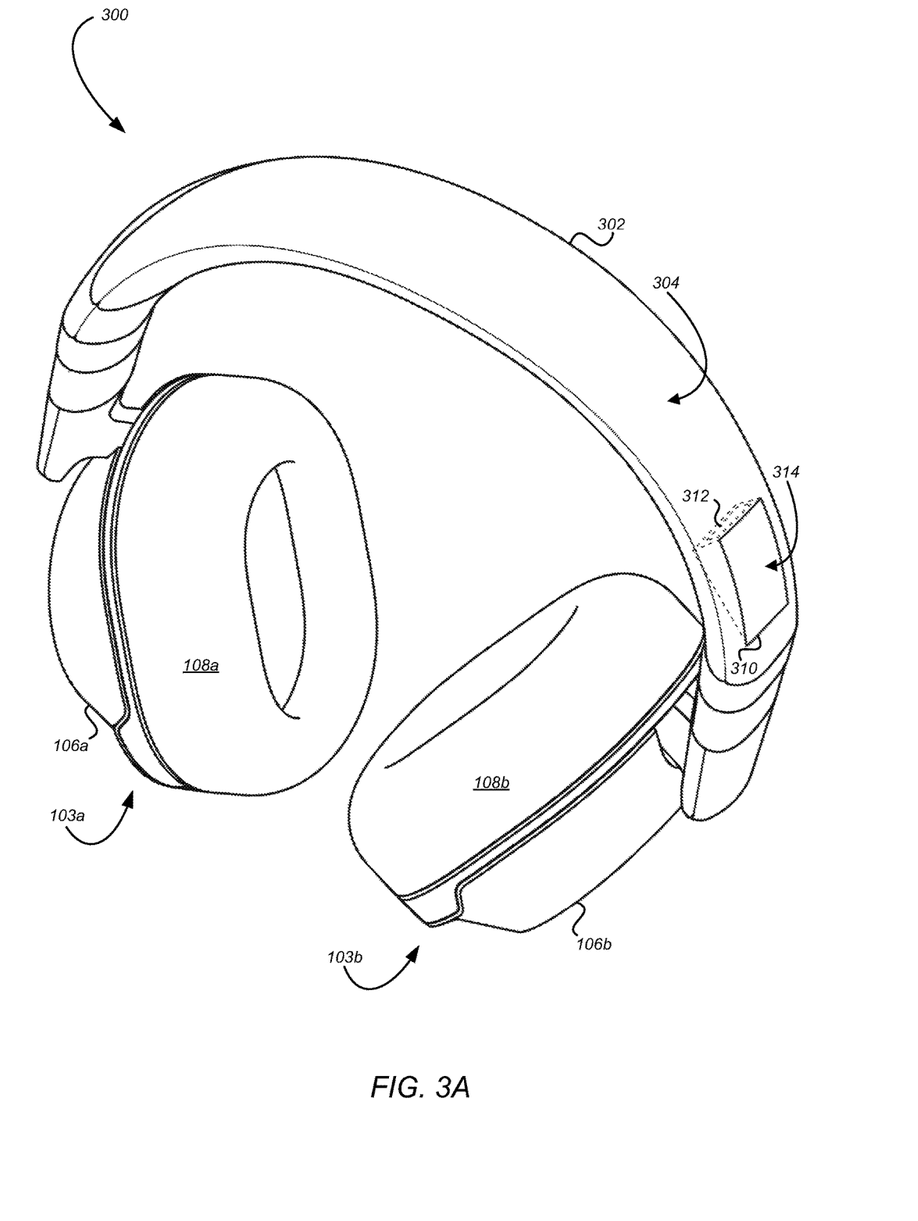
FIGS. 3A and 3B are perspective views of a head-worn audio device with wireless dongle storage, in accordance with one or more embodiments of the invention.
Figure 3B:
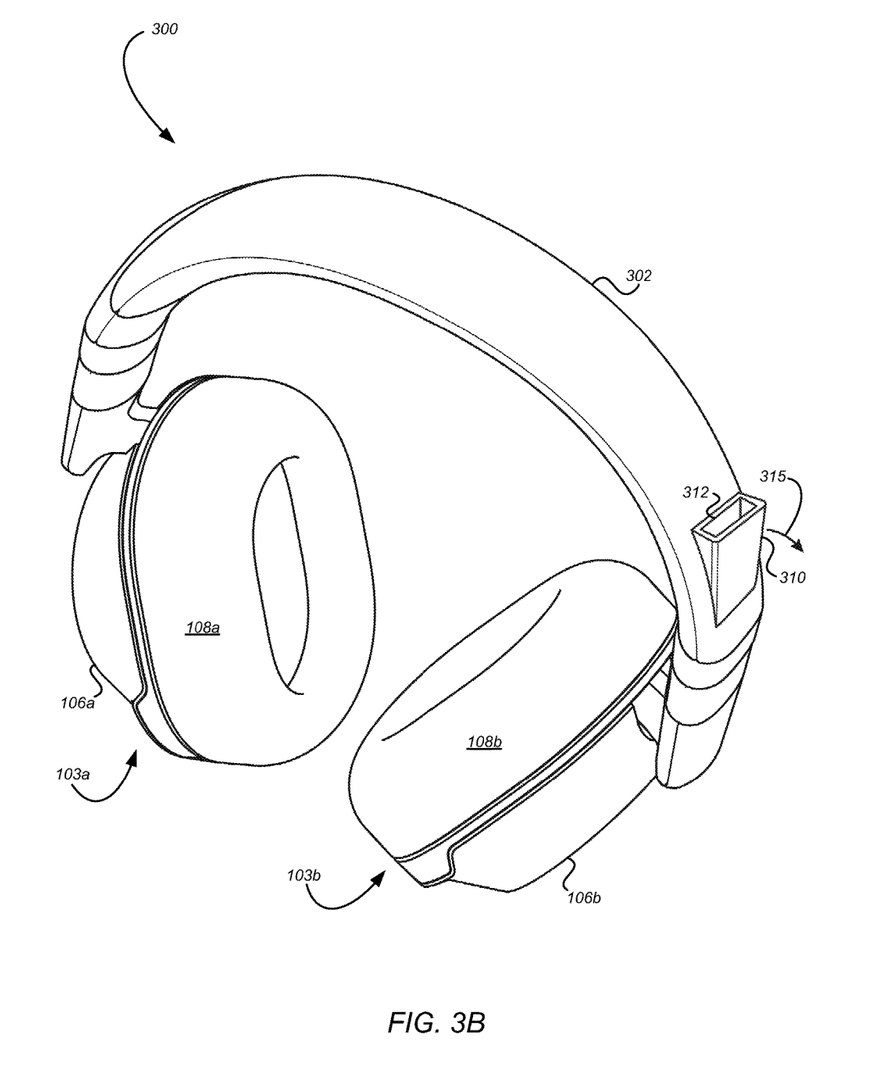

FIGS. 3A and 3B show a head-worn audio device 300 according to one or more embodiments. Although the elements of the head-worn audio device 300 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 3A and 3B may be omitted, repeated, and/or substituted. Accordingly, various embodiments may lack one or more of the features shown. For this reason, embodiments of the invention should not be considered limited to the specific arrangements of elements shown in FIGS. 3A and 3B.

Referring to FIG. 3A, the head-worn audio device 300 is shown to include a headband 302 that interconnects a left ear sub-assembly 103a and a right ear sub-assembly 103b. The left ear and right ear sub-assemblies 103 may be substantially identical to those described above in the context of FIGS. 1A and 1B. The headband 302 is a curved or arched band having the left ear sub-assembly 103a disposed at a first end of the headband 302 and the right ear sub-assembly 103b disposed at a second end of the headband 302. The headband 302 may be configured to rest on top of the head of a user wearing the head-worn audio device 300, such that the head-worn audio device 300 is entirely supported by the user's head with the left ear sub-assembly 103a and right ear sub-assembly 103b pressed against the user's left and right ears, respectively. In one or more embodiments, the headband 202 may include a rigid metal or plastic member. Further, in one or more embodiments, cables traveling along and/or within the headband 202 may enable communication (e.g., audio signals, digital communications, etc.) between electronic and/or acoustic componentry housed in the different ear sub-assemblies 103.

The headband 302 of the head-worn audio device 300 includes a hidden receptacle 310 that is located proximate to the right ear sub-assembly 103b. Although the receptacle 310 is depicted proximate to the right ear sub-assembly 103b, it is understood that, in one or more embodiments, the receptacle 310 may instead be proximate to the left ear sub-assembly 103a. As depicted in FIG. 3A, the receptacle 310 is closed, such that an outer surface 314 of the hidden receptacle 310 is generally co-planar with an outer surface 304 of the headband 302. In other words, when the receptacle 310 is closed, the outer surface 314 of the receptacle 310 and the outer surface 304 of the headband 302 may be flush, such that the receptacle 310 is hidden from view. The hidden receptacle 310 is a generally rigid and at least partially hollow member that includes a cavity 312 for receiving a plug of a wireless dongle (not shown). For example, and referring now to FIG. 3B, the head-worn audio device 300 is shown with the receptacle 310 opened and the cavity 312 accessible for inserting a plug of a wireless dongle. In particular, the receptacle 310 opens along a path 315 to expose the cavity 312. In one or more embodiments, the receptacle may rotate about a pivot or hinge (not shown) when moving along the path 315. In one or more embodiments, the hidden receptacle 310 may be held in a closed position by way of a detent, latch, or other suitable mechanism.

The characteristics and dimensions of the cavity 312 of the receptacle 310 may be substantially identical to those of the cavity 112 of the receptacle 110, described in reference to FIGS. 1A and 1B, above.

Figure 4A:
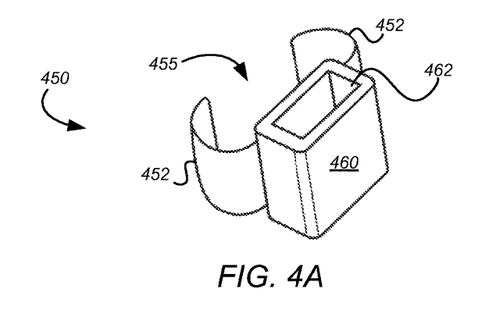
FIGS. 4A and 4B are perspective views showing a head-worn audio device with removable wireless dongle storage, in accordance with one or more embodiments of the invention.
Figure 4B:
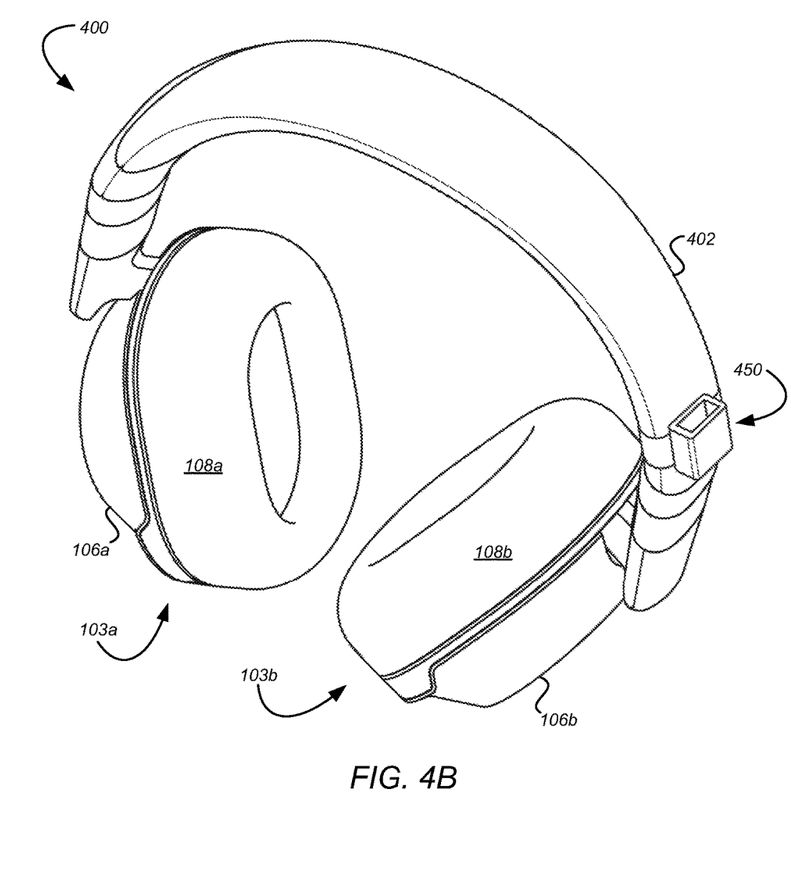

FIGS. 4A and 4B show a head-worn audio device 400 with a removable dongle caddy 450 according to one or more embodiments. Although the elements of the head-worn audio device 400 and the dongle caddy 450 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 4A and 4B may be omitted, repeated, and/or substituted. Accordingly, various embodiments may lack one or more of the features shown. For this reason, embodiments of the invention should not be considered limited to the specific arrangements of elements shown in FIGS. 4A and 4B.

Referring to FIG. 4A, a dongle caddy 450 includes receptacle 460 fixedly coupled to a clip 452. The receptacle 460 includes a cavity 462. The characteristics and dimensions of the cavity 462 of the receptacle 460 may be substantially identical to those of the cavity 112 of the receptacle 110, described in reference to FIGS. 1A and 1B, above. In one or more embodiments, the clip 452 may include a resilient (e.g., metal, plastic, etc.) C-shaped member with an opening 455. The opening 455 of the clip 452 allows for passage of a headband of a head-worn audio device when the dongle caddy 450 is being attached to or remove from the headband. The dongle caddy 450 attaches to a headband by way of an interior surface of the clip 452 applying a clamping pressure to the headband. Accordingly, the opening 455 may be configured to allow insertion and removal of the headband, while the clip 452 may be configured to have inner dimensions slightly smaller than a section of the headband to which the clip 452 is coupled.

For example, referring to FIG. 4B, the dongle caddy 450 is shown attached to a headband 402 of a head-worn audio device 400. The headband 402 of the head-worn audio device 400 is shown to interconnect a left ear sub-assembly 103a and a right ear sub-assembly 103b. The left ear and right ear sub-assemblies 103 may be substantially identical to those described above in the context of FIGS. 1A and 1B. Also, the headband 402 is a curved or arched band having the left ear sub-assembly 103a disposed at a first end of the headband 302 and the right ear sub-assembly 103b disposed at a second end of the headband 302. When the dongle caddy 450 is attached to the headband 402, the clip 452 squeezes the headband 402 such that the headband 402 applies an outward pressure to the interior surface of the clip 452, holding the dongle caddy 450 in place on the headband 402. Of course, the dongle caddy 450 may be removed by a user, according to his or her preferences.

Figure 5A:
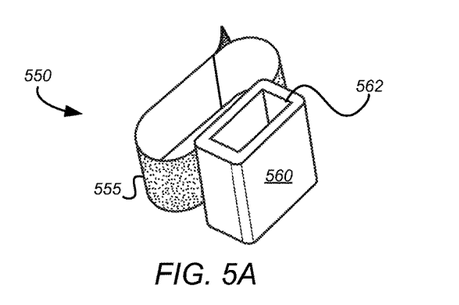
FIGS. 5A and 5B are perspective views showing a head-worn audio device with removable wireless dongle storage, in accordance with one or more embodiments of the invention.
Figure 5B:
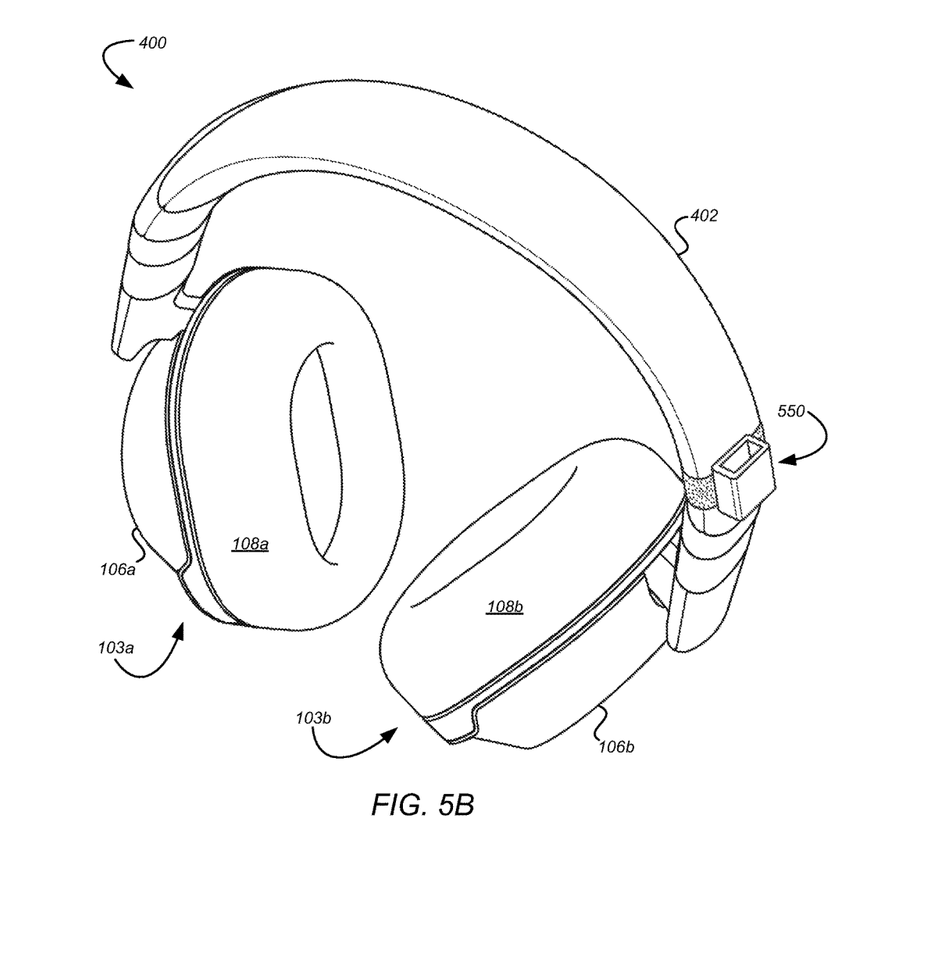

FIGS. 5A and 5B show a head-worn audio device 400 with a removable dongle caddy 550 according to one or more embodiments. Although the elements of the head-worn audio device 400 and the dongle caddy 550 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 5A and 5B may be omitted, repeated, and/or substituted. Accordingly, various embodiments may lack one or more of the features shown. For this reason, embodiments of the invention should not be considered limited to the specific arrangements of elements shown in FIGS. 5A and 5B.

Referring to FIG. 5A, the dongle caddy 550 includes receptacle 560 fixedly coupled to a strap 555. The receptacle 560 includes a cavity 562. The characteristics and dimensions of the cavity 562 of the receptacle 560 may be substantially identical to those of the cavity 112 of the receptacle 110, described in reference to FIGS. 1A and 1B, above. The strap 555 may comprise any flexible material, such as a nylon or elastic fabric. The strap 555 may include hook and loop fasteners, a snap, and/or or buckle for securing a first end of the strap to a second end of the strap. Accordingly, to secure the dongle caddy 550 to a headband, the strap 555 may be wrapped around the headband such that the first end of the strap 555 securely engages the second end of the strap 555.

For example, referring to FIG. 5B, the dongle caddy 550 is shown attached to a headband 402 of a head-worn audio device 400. When the dongle caddy 550 is attached to the headband 402, the strap 555 circles a segment of the headband 402 and engages itself such that the dongle caddy 550 is held in place on the headband 402. Of course, the dongle caddy 550 may be easily removed by a user, according to his or her preferences.

Because a wireless dongle may enhance the quality and functionality of a wireless link between a head-worn audio device and a host device, a lost wireless dongle can be quite troublesome. Disclosed hereinabove are several embodiments for storing wireless dongles on the headband of a head-worn audio device. The various embodiments disclosed above provide for readily accessible storage of a wireless dongle, while reducing the likelihood of unintentionally separating the wireless dongle from its associated headphones or headset.

A number of implementations have been described. Nevertheless, various modifications may be made without departing from the scope of the disclosure. Accordingly, other implementations are within the scope of the following claims.

What is claimed is:
1. A head-worn audio device, comprising:
    a headband having a first end and a second end, the headband including a receptacle configured for removable insertion of a wireless dongle;
    a first ear sub-assembly disposed at the first end of the headband, the first ear sub-assembly including a first earcup and a first ear cushion coupled to the first earcup; and
    a second ear sub-assembly disposed at the second end of the headband, the second ear sub-assembly including a second earcup and a second ear cushion coupled to the second earcup.

2. The head-worn audio device of claim 1, wherein the first ear sub-assembly includes a left ear sub-assembly and the second ear sub-assembly includes a right ear sub assembly.

3. The head-worn audio device of claim 2, wherein the receptacle is located on the headband proximate to one of the left ear sub-assembly and the right ear sub-assembly.

4. The head-worn audio device of claim 1, wherein the receptacle is located at an apex of the headband.

5. The head-worn audio device of claim 1, wherein the receptacle includes a cavity configured for the removable insertion of a Universal Serial Bus Type A plug of the wireless dongle.

6. The head-worn audio device of claim 1, wherein the receptacle includes a cavity configured for the removable insertion of a Universal Serial Bus Type C plug of the wireless dongle.

7. The head-worn audio device of claim 1, wherein the receptacle is removably attached to the headband.

8. The head-worn audio device of claim 1, wherein the receptacle transitions between an open position and a closed position, and an outer surface of the receptacle is substantially flush with an outer surface of the headband when the receptacle is in the closed position.

9. A head-worn audio device, comprising:
a headband having a first end and a second end, the headband including a receptacle configured for removable insertion of a wireless dongle; and
an ear sub-assembly disposed at one of the first end and the second end of the headband, the ear sub-assembly including an earcup and an ear cushion coupled to the earcup.

10. The head-worn audio device of claim 9, wherein the receptacle is located on the headband proximate the ear sub-assembly.

11. The head-worn audio device of claim 9, wherein the receptacle is located at an apex of the headband.

12. The head-worn audio device of claim 9, wherein the receptacle includes a cavity configured for the removable insertion of a Universal Serial Bus Type A plug of the wireless dongle.

13. The head-worn audio device of claim 9, wherein the receptacle includes a cavity configured for the removable insertion of a Universal Serial Bus Type C plug of the wireless dongle.

14. The head-worn audio device of claim 9, wherein the receptacle is removably attached to the headband.

15. The head-worn audio device of claim 9, comprising:
a second ear sub-assembly disposed at the second end of the headband, the second ear sub-assembly including a second earcup and a second ear cushion coupled to the second earcup;
wherein the ear sub-assembly is disposed at the first end of the headband.

16. The head-worn audio device of claim 9, wherein the receptacle transitions between an open position and a closed position, and an outer surface of the receptacle is substantially flush with an outer surface of the headband when the receptacle is in the closed position.

17. A dongle caddy, comprising:
a receptacle configured for removable insertion of a wireless dongle; and
attachment means for removable attachment to a headband of a head-worn audio device, wherein the attachment means is fixedly coupled to the receptacle.

18. The dongle caddy of claim 17, wherein the attachment means includes a fabric strap.

19. The dongle caddy of claim 17, wherein the attachment means includes a clip.

20. The dongle caddy of claim 17, wherein the receptacle includes a cavity configured for the removable insertion of one of: a Universal Serial Bus Type A plug of the wireless dongle and a Universal Serial Bus Type C plug of the wireless dongle.

* * * * *